United States Patent [19]

Lowe, Jr.

[11] 4,199,662

[45] Apr. 22, 1980

[54] HYBRID CONTROL OF TIME DIVISION MULTIPLEXING

[76] Inventor: Charles S. Lowe, Jr., 809 Welcome Ct., Burnsville, Minn. 55337

[21] Appl. No.: 925,377

[22] Filed: Jul. 17, 1978

[51] Int. Cl.$^2$ .......................... H04J 3/08; H04J 3/12; H04J 6/00
[52] U.S. Cl. ...................................... 370/85; 370/86; 370/91
[58] Field of Search ......... 179/15 AL, 15 BA, 15 BS, 179/15 BV

[56] References Cited

U.S. PATENT DOCUMENTS

| | | | |
|---|---|---|---|
| 3,303,476 | 2/1967 | Moyer | 340/172.5 |
| 3,396,372 | 8/1968 | Calvert | 340/172.5 |
| 3,573,740 | 4/1971 | Berger | 340/172.5 |
| 3,597,549 | 8/1971 | Farmer | 179/15 AL |
| 3,603,932 | 9/1971 | Kerr | 179/15 AL |
| 3,659,271 | 4/1972 | Collins | 340/172.5 |
| 3,668,649 | 6/1972 | Pedersen | 340/172.5 |
| 3,688,273 | 8/1972 | Narang | 340/172.5 |
| 3,772,656 | 11/1973 | Serracchioli | 340/172.5 |
| 3,879,710 | 4/1975 | Maxemchuk | 340/172.5 |
| 3,921,137 | 11/1975 | McClearn | 179/15 AL |
| 3,990,036 | 11/1976 | Savit | 340/172.5 |
| 4,071,711 | 1/1978 | Beaupre | 179/15 AL |

OTHER PUBLICATIONS

IBM Technical Bulletin, vol. 8, No. 11, Apr. 1966, "Data Adapter Unit Auto-Poll".

*Primary Examiner*—David L. Stewart
*Attorney, Agent, or Firm*—Merchant, Gould, Smith, Edell, Welter & Schmidt

[57] ABSTRACT

A hybrid multiplexing method and communications system for controlling transmission of information between a plurality of remote terminals and a shared central facility over a common communications channel. The remote terminals are synchronously polled to ascertain whether or not the remote terminals desire access to the central facility. Asynchronous polling is utilized to establish communication between the central unit and the remote terminals desiring access to the central unit.

12 Claims, 13 Drawing Figures

HYBRID CONTROL OF TIME DIVISION MULTIPLEXING

BACKGROUND OF THE INVENTION

The present invention relates broadly to a multiplexing system and method in a communications system wherein a plurality of low-volume users share the services of at least one high volume central unit or facility. More particularly, the present invention relates to a communication system and multiplexing system wherein the low-volume users are sychronously polled to ascertain whether or not the low-volume users desire access to the central facility and asynchronously polled to establish communication between the central facility and the low-volume user desiring access to the central facility.

Multiplexing is generally known in several prior systems to provide overall system economy of operation. Multiplexing systems include space division multiplexing, frequency division multiplexing, and time division multiplexing. Time division multiplexing is a commonly used technique in communications and computer/communications systems.

In time division multiplexing the common facility or central unit is used by no more than one user at any one time. The total available time of the common facility is segmented and each user is assigned a segment of time for use of the common facility. Systems for controlling usage of the common facility on the time shared basis include both synchronous and asynchronous control.

In synchronous control the time that the common shared facility has available is divided into time segments and each user is assigned a specific time segment. The users are then given access to the central unit in sequence and the sequence is repeated after the last user has been given access to the common facility. Time information must be provided to each user so that each user can ascertain when its time slot occurs. Each time slot is typically the same duration to minimize cost of communicating time information to the user. In the asynchronous control systems the time that the common facility is available is divided into segments that may be variable and dynamically changing in duration. The sequence of individual user access to the common facility may also be variable. Each user is informed as to when it may use the common facility immediately prior to being given access to the common facility. Once the remote user terminates its activity with the shared facility the system control selects the next user who will be provided access to the common facility.

In synchronous multiplexing control with each user assigned a specific time slot the user is free to use the central facility or not use the central facility during the assigned slot. In asynchronous multiplexing control, two basic modes are employed to determine the order of access to the common facility. In the contention system when two or more users simultaneously attempt to use the common facility the selection of the user is based on a priority system. In a polling system the remote users are individually queried on a periodic basis to ascertain whether or not each user desires to use the common facility. Polling may be implemented by centralized control and distributed control. In the centralized form of polling system all queries are initiated and transmitted from a single point to each individual user of the common facility in succession. In distributed form each user polls the next user in sequence once it has completed its use of the common facility.

While each type of multiplexing system, i.e. synchronous or asynchronous control, has certain advantages in specific circumstances, each also has significant disadvantages. Though the synchronous control method provides more efficient utilization of the common facility in environments where the duration of each use is constant, it also results in a user which does not need access to the common facility denying access to the user who does have need of the common facility. Similarly, even though asynchronous control provides more efficient utilization of the common facility in environments where the duration of use varies over a wide range of time and circumstances, it requires a polling contention resolving scheme to regulate access to the common facility.

In order to maximize the cost effectiveness of a communication system wherein a plurality of remote individual users share a high capacity central facility, it is desirable to alter the multiplexing control in accordance with the operating environment. One may do so by recognizing the two basic tasks performed in establishing communication between the central unit and a plurality of remote individual users. For the purposes herein, the word "terminal" is understood to mean a remote terminal location having at least one terminal station having a data source and/or a data sink. The first task is the identification of the remote user or terminal that has information available for transmission to the central facility. The other basic task is the communication of such information between the remote terminals and a central facility. The first task relates essentially to fixed length status messages lending itself to synchronous multiplexing control. The second task deals with text messages and information that may vary in size and duration, thus being amenable to asynchronous multiplexing control. The present invention is a hybrid multiplexing system and method that employs synchronous control for the status reporting task and asynchronous multiplexing control for all other operations including input and output of text information messages between central unit and the plurality of remote user terminals. Thus, the advantages of both synchronous and asynchronous polling is incorporated into the present invention optimizing the system performance. The present invention reduces the amount of time required to accomplish multiplexing and reduces the resources required to control the multiplexing process. By incorporating the hybrid multiplexing of the present invention the useful capacity of the common facility shared by the multiple users is increased.

SUMMARY OF THE INVENTION

The present invention is a communications system that includes a plurality of remote terminals which time share at least one central unit over a common communications channel. The present invention includes multiplexing means at the central unit for initiating and transmitting a single status request command signal over the common communications channel to the plurality of remote terminals. The multiplexing means further includes means at each of the remote terminals for generating a status response message and transmitting the status response message to the central unit. Finally, control means at each of the remote terminals provide sequenced transmission of the status response messages to the central unit. The control means includes a timing means responsive to the single status request command signal to initiate transmission of the status message at pre-selected times following receipt of the status request command.

The present invention is also a communications system having a plurality of remote terminals connected to a central unit time shared by the remote terminals over a common communications channel. Multiplexing means are provided for the transmission of status and text information between the remote terminals and the central unit with multiplexing control means included at the central unit for synchronously polling each remote terminal to ascertain status information and for asynchronously polling each remote terminal to initiate the transmission of text information from the remote terminal to the central unit. Means at each remote terminal are provided for transmitting status information and text messages to the central unit in response to signals from the synchronous and asynchronous polling means. The synchronous polling means includes means at the central unit for initiating a stop command message and means at the remote terminals for receiving the stop command message and terminating the sequenced transmission of status information from the remote terminals to the central unit. The stop command message is typically generated when the central unit receives a status message from a remote terminal indicating that the remote terminal has text information available for transmission to the central unit. Upon termination of status reporting, the central unit will then asynchronously poll the remote terminal reporting available text information and the remote terminal will transmit the text information to the central unit.

The present invention is also a multiplexing method including the step of synchronously polling each remote terminal to ascertain status information thereof and asynchronously polling each remote terminal to initiate the transmission of text information from the remote terminals to the central unit. In the preferred embodiment the method includes initiating and transmitting a single status request command signal over the common communication channel to the remote terminals, receiving the status request command signal at the remote terminals and providing sequenced transmission of status information to the central unit in response to the status request command signal.

The advantages of the present invention will become more apparent with reference to the accompanying drawings, detailed description of the preferred embodiment, and claims. The present invention is disclosed herein in two basic embodiments, one a hardwired communications system and the other a communications system incorporating microprocessors associated with the remote terminals. It will be understood that equivalents of these preferred embodiments are contemplated within the spirit and scope of the present invention.

BRIEF DESCRIPTION OF THE DRAWING

FIG. 4A-4G is a logic flow chart of the operation of either embodiment of the remote terminals in the handling and transmission of data between the remote terminal and the central processing unit;

FIG. 5A-5C is a logic flow chart of the operation of the central processing unit of the communications system shown in FIG. 1.

DETAILED DESCRIPTION OF PREFERRED EMBODIMENTS

Figure 1:
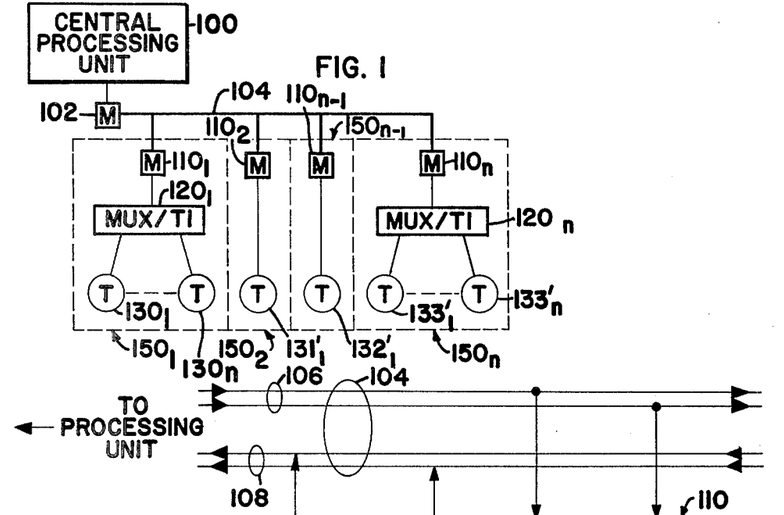
FIG. 1 is a schematic representation of a communications system incorporating the present invention.

Referring to the drawings wherein like numerals represent like parts throughout the several views, FIG. 1 illustrates schematically a communication system wherein information is exchanged between a central processing unit 100 and a plurality of a remote terminals designated $150_1$, $150_2$, $150_n$-1, and $150_n$, where n can be any integer greater than 1. Each remote terminal includes at least one remote terminal station $130_1, 131_1{}^1, 132_1{}^1, 133_1{}^1$. Communication between central processing unit 100 and remote terminals $150_1$–$150_n$ is established through a modem/circuit terminator 102 over a common communications channel 104. Each remote terminal $150_1$–$150_n$ is connected to communications line 104 through a remote modem/circuit terminator $110_1$–$110_n$. Remote terminal stations $130_1$–$133_n{}^1$ may be connected directly to a remote modem/circuit terminator or be connected to the remote modem/circuit terminator through a multiplexer/terminal interchange $120_1$–$120_n$. Either the remote modem/circuit terminator $110_1$–$110_n$ or the multiplexer/terminal interchange $120_1$–$120_n$ will provide the signal processing and control for the transmission and receipt of signals between central processing unit 100 and remote terminal stations $130_1$–$133_n{}^1$ as will be described in more detail hereafter.

Central processing unit 100 initiates, commands and controls the transfer of the various status, input and output text messages transmitted between central processing unit 100 and the remote terminals $150_1$–$150_n$. The input status and input text messages generated at the remote terminals are multiplexed on common communications channel 104 and transmitted to central processing 100 such that only one of remote terminals $150_1$–$150_n$ use communications channel 104 at any one time. As will be described in more detail hereafter, a hybrid multiplexing process of the present invention is employed in the communications system such that input status messages transmitted by remote terminals $150_1$–$150_n$ are controlled by synchronous time division multiplexing while input text messages transmitted to central processing unit 100 are controlled by asynchronous time division multiplexing.

Figure 2:
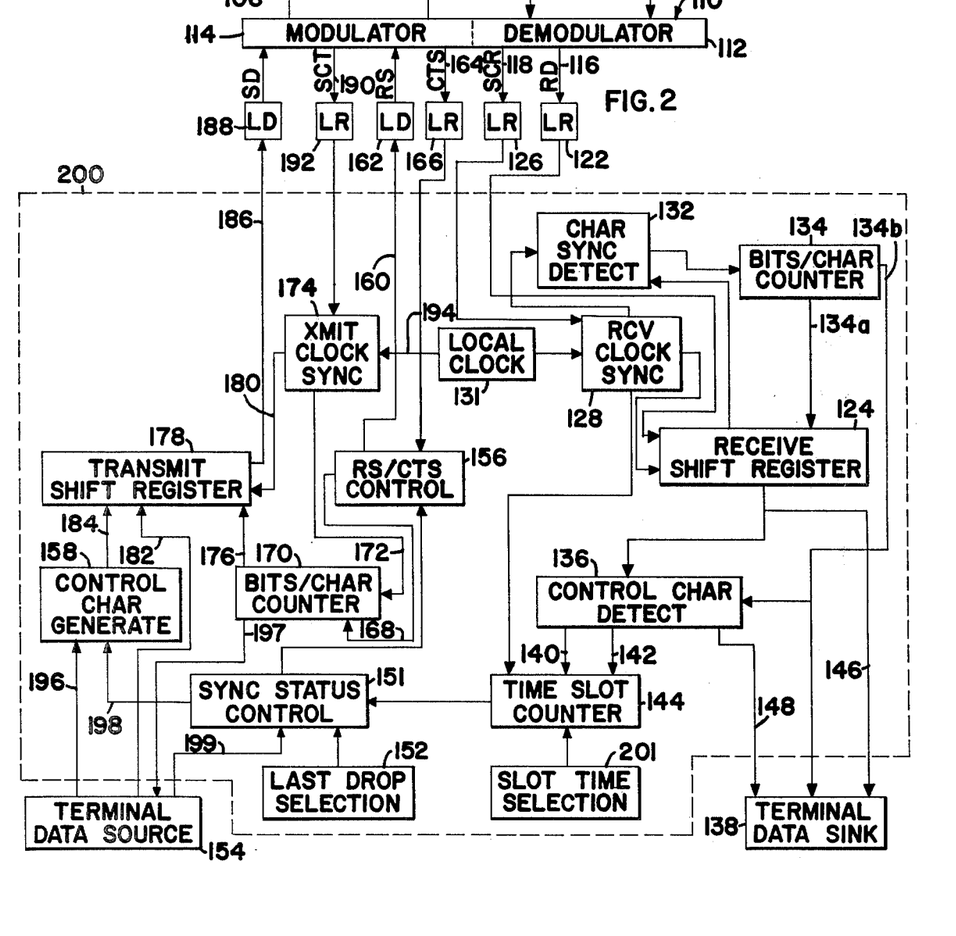
FIG. 2 is a block diagram of one embodiment of the remote terminals of the communications system of FIG. 1.

FIG. 2 illustrates in block diagram form a hard-wired implementation of the hybrid multiplexing system of the present invention. More particularly, the hybrid multiplexing control network is designated generally as 200. It will be understood that hybrid-multiplexing control network 200 may be associated with remote terminal station $130_1$–$133'_n$ or on the other hand, may be associated with remote multiplexer/terminal interchange $120_1$–$120_n$. For the sake of clarity of description it will be assumed that hybrid-multiplexing control network 200 is distinct from remote modem/circuit terminator 110. It will also be assumed during the following description that references are made to a single remote terminal station, each of the various remote terminals having an identical or substantially identical hybrid-multiplexing control network 200.

Remote modem/circuit terminator 110 includes a demodulator section 112 and a modulator section 114. The demodulator section 112 receives status request command messages and output text transmissions from central processing unit 100 along an outbound segment 106 of communications channel 104. The demodulator section 112 has a pair of outputs 116 and 118. The signal transmitted from central processing unit 100 to demodulator section 112 is demodulated and a first output signal is generated on output 116 and applied through a line receiver 122 to a receive shift register 124. A serial clock received timing signal is also generated by demodulator section 112 and applied through output 118 and a line receiver 126 to a clock synchronization circuit 128. Clock synchronization circuit 128 also receives a signal from a clock 131 and the serial clock receiving signal is synchronized with clock 131 and used to sample and shift a received message into and through shift register 124. Clock synchronization circuit 128 and shift register 124 provide output signals to a character synchronization detection circuit 132 which detects character synchronization within the bit serial information stream containing the received message from central processing unit 100. Character synchronization circuit 132 provides an output signal to a bits per character counter 134 which maintains character synchronization for the duration of the received message by counting the number of bits comprising each character once character synchronization is obtained by circuit 132. Bits per character counter 134 has a pair of outputs 134a and 134b providing a signal to shift register 124 to a control character detect circuit 136 and the remote terminal data sink 138, respectively. Shift register 124 also has an output providing a signal to control character detect circuit 136. Circuit 136 samples the contents of shift register 124 once each character time as determined by the input to control character detect circuit 136 from bits per character counter 134. Control character detect 136 provides output signals including a status request signal at 140, and a stop signal at 142 to a time slot counter 144. Time slot counter also receives a input signal from clock circuit 128 and a slot time selection circuit 201. Shift register 124 and control character detect circuit 136 also provide input signals at 146 and 148, respectively, to terminal data sink 138.

Time slot counter 144 transmits an enable signal to a synchronous status control circuit 151. Synchronous status control circuit 151 also receives input signals from a last drop selection circuit 152 and a terminal data source 154. Synchronous status control circuit 151 generates an enable signal which is fed to a RS/CTS control circuit 156 and an output signal to a control character generate circuit 158. RS/CTS control circuit 156 has an output signal at 160 which is fed through a line driver 162 to modulator section 114 of modem 110. Modulator 114 generates signal on line 164 which is fed through line receiver 166 to RS/CTS control circuit 156. Control circuit 156 also has an output at line 168 which is fed to a bits per character counter 170. Bits per character counter 170 has a second input along line 172 from a transmit clock synchronization circuit 174. Bits per character counter 170 has an output at line 176 to a transmit shift register 178. Shift register 178 has additional inputs on lines 180, 182, and 184 from transmit clock synchronization circuit 174, terminal data source 154, and control character generate circuit 158 respectively. An output signal from transmit shift register 178 is fed along line 186 through line driver 188 to modulator section 114 of modem 110. Modulator section 114 generates an output signal on line 190 through a line receiver 192 to clock synchronization circuit 174. Synchronization circuit 174 also receives an input on line 194 from clock 131. Control character generate circuit 158 receives a pair of input signals on lines 196 and 198 from terminal data source 154 and synchronous status control circuit 151, respectively. Bits per character counter circuit 170 generates an input on line 197 to terminal data source 154 and terminal data source 154 has an output on line 199 which is fed to synchronous status control circuit 151. Returning to the receiver section of hybrid multiplexing control network 200, time slot counter 144 receives an input signal from slot time selection circuit 201 and an additional input from receiver clock synchronization circuit 128. The output of time slot counter 144 is fed to synchronous status control circuit 151. A signal generated by modulator section 114 of modem 110 is applied on inbound circuit 108 to central processing unit 100.

The operation of the present invention will now be described with reference to the hardwired embodiment of FIG. 2. Central processing unit 100 transmits an output message through modem/circuit terminator 102, over outbound circuit 106 of common communications facility 104 to the remote modems/circuit terminators $110_1$–$110_n$. The output message is demodulated at each remote modem /circuit terminator 110, for example, and the message is generated as an output signal 116 which is fed through line receiver 122 to shift register 124. A timing signal at 118 is applied through line receiver 126 to clock synchronization circuit 128. An output from synchronization circuit 128 and an output from shift register 124 are used by character synchronization detection circuit 132 to detect character synchronization within the bit serial information stream containing the transmitted messages. The detection of character synchronization provides a signal initiating bit counting to the bits per character counter 134 which maintains character synchronization for the duration of the received message by counting the number of bits comprising each character once character synchronization is obtained. Character detection circuit 136 samples the contents of shift register 124 once each character time as determined by the input to control character detect circuit 136 from bits per character counter 134. When a status request control character in the received message is detected by circuit 136, an input signal is applied along line 140 to initialize and enable time slot counter 144. Time slot counter 144 then begins counting time based upon an input signal from clock synchronization circuit 128. When time slot counter 144 advances to the point where the terminal location status reporting time slot is to begin as determined by selection circuit 201, a signal is transmitted by counter 144 to enable synchronous status control circuit 151. Once circuit 151 is enabled if there is either data to transmit as indicated by a signal on line 199 from terminal data source 154 or if this terminal is the designated last terminal on the common communication facility as indicated by the signal from last drop selection circuit 152, the transmission of the status message is begun by a signal from circuit 151 enabling RS/CTS control circuit 156. Circuit 156 transmits a request to send signal on line 160 to modem 110 through a line driver 162. Once modem 110 begins transmission and after any necessary bit synchronization time delays, modem 110 sends a clear to send signal on line 164 through line receiver 166 to RS/CTS circuit 156. At this point control circuit 156 generates a signal enabling bits per character counter 170. The status message transmission then occurs with the bits per character counter 170 and an output on line 180 from transmit clock synchronization circuit 174 controlling the operation of transmit shift register 178. The rate at which the bit serial status message is transmitted is determined by a serial clock transmit signal on line 190 transmitted by modem 110 to clock synchronization circuit 174 via line receiver 192. The transmit data available signal on line 199 from data source 154 to synchronous status control circuit 151 controls an output signal on line 198 to character generate circuit 158 such that the status message transmitted to central processing unit 100 will indicate by a contained control character whether or not there is terminal data available to transmit from this terminal location. As the status message is shifted from shift register 178 it is passed to modem 110 by line 186 through line driver 188. The status message is then transmitted by modem 110 to central processing unit 100 through inbound circuit 108 of the common communications facility 104. Central processing unit 100 may transmit a signal to stop synchronous status report process in midcycle if it determines there is input traffic available to transmit from another remote location. The stop command message is transmitted by central processing unit 100 to all of the remote terminal locations by the shared common communications facility 104. The stop command message is demodulated in the demodulator section 112 of the remote modem/circuit terminator 110 and passed to shift register 124 through line receiver 122. Again a serial clock receiver timing signal is generated at 118 and passed to clock synchronization circuit 128 by line receiver 126. After synchronization with clock 131 the timing signal is used to sample and shift the stop command message into and through the receiver shift register 124. Control character detect circuit 136 samples the contents of shift register 124 and when the stop control character in the stop command message is detected, circuit 136 applies an input signal along line 142 to time slot counter 144 causing time slot counter 144 to stop counting and to be cleared. Time slot counter 144 transmits a signal to synchronous status control 151 which also clears this circuit and in turn causes circuit 151 to transmit a clear signal to RS/CTS control circuit 156. With circuit 156 cleared, the request to send signal on line 160 is inactive terminating any transmission which may have been in progress from modem 110 to central processing unit 100.

Other output text messages from central processing unit 100 or other output command messages, excluding the status request or stop signals previously discussed, may be transmitted through central processing unit 100 to the remote terminal locations. Such other signals are again received and demodulated by modem 110 which transmits the message at 116 to shift register 124 and generates a timing signal at 118 which is passed to receiver clock synchronization circuit 128. Control character detect circuit 136 samples shift register 124 and the control characters thus detected in the message or output command messages are passed as input signals 148 to terminal data sink 138 for action as may be appropriate. The contents of the received output text message or output command is transferred to data sink 138 on a character by character basis as it is assembled in the received shift register 124 together with a received character timing signal transmitted by bits per character counter 134 to terminal data sink 138. The contents of the received output text messages or command message may then be acted upon by terminal data sink 138 as may be appropriate in the particular application.

Input text message and/or input status messages at the remote terminal, excluding the status messages associated with the synchronous status reporting, may be transmitted by the remote terminal locations to central processing unit 100. Such input text or status messages are prepared or generated at terminal data source 154. The text message is transmitted from terminal data source 154 to transmit shift register 178 on a character by character basis in conjunction with a transmit character timing signal generated on line 197 by bits per character counter 170. The timing signal on line 197 is based on a serial clock timing signal on line 190 generated by modem 110 and transmitted to transmit clock synchronization circuit 174 through line receiver 192 where it is synchronized with a signal from clock 131. Outputs on line 180 and 172 from transmit clock synchronization circuit 174 control the operating rate of transmit shift register 178 and bits per character counter 170, respectively. When an input text message or input status message is available for transmission from terminal data source 154, the transmit data available signal on line 199 which is applied to synchronous status control circuit 151 causes RS/CTS control circuit 156 to activate a request to send signal on line 160 through line driver 162 to modem 110. Once modem 110 begins transmission and after any necessary bit synchronization time delays, modem 110 sends a clear to send signal on line 164 through line receiver 166 to control circuit 156 which generates a signal on line 168 to enable bits per character counter 170. The input text message or input status message is then transmitted from terminal data source 154 on line 182 to transmit shift register 178. The message is then passed to modem 110 on line 186 through line driver 188 and then to central processing unit 100 over inbound circuit 108 of common shared communications facility 104. Control characters in the input text message or input status message are accommodated by the transmit control character signal generated on line 196 by data source 154 and fed to control character generate circuit 158 which generates any required control characters and inputs them along line 184 to shift register 178 for transmission with the input text message or status message to central processing unit 100.

Figure 3:
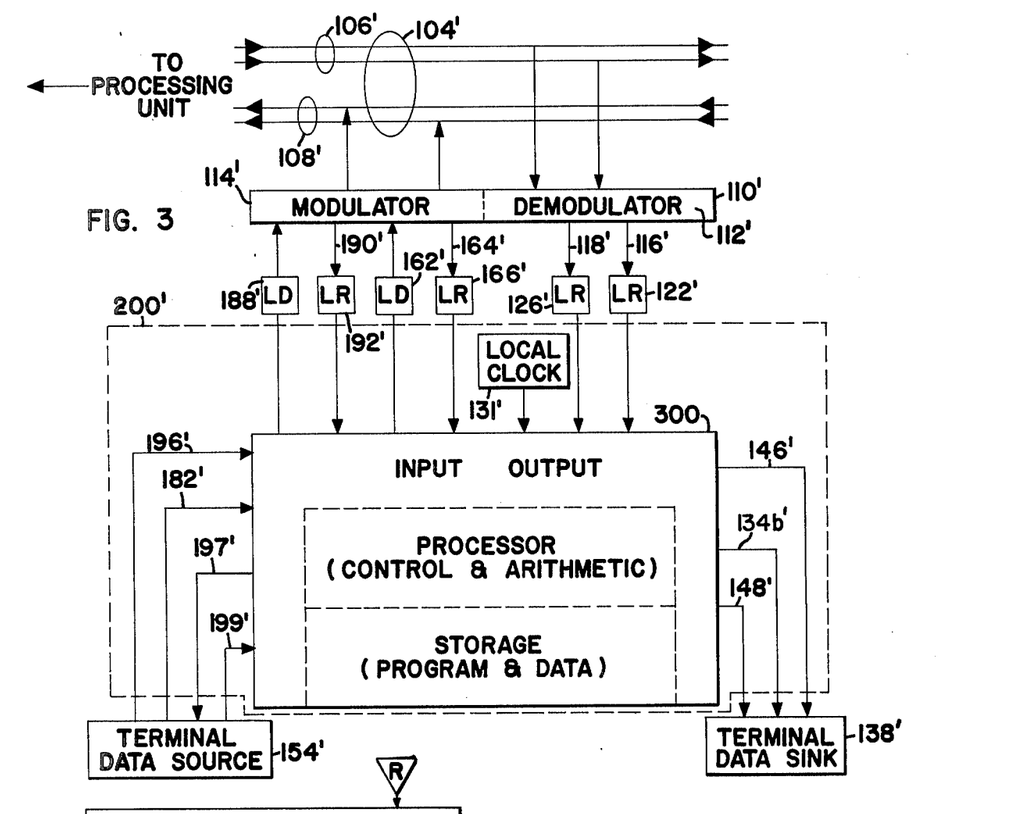
FIG. 3 is a block diagram of a second embodiment of the remote terminals of the communications system.
Figure 4A:
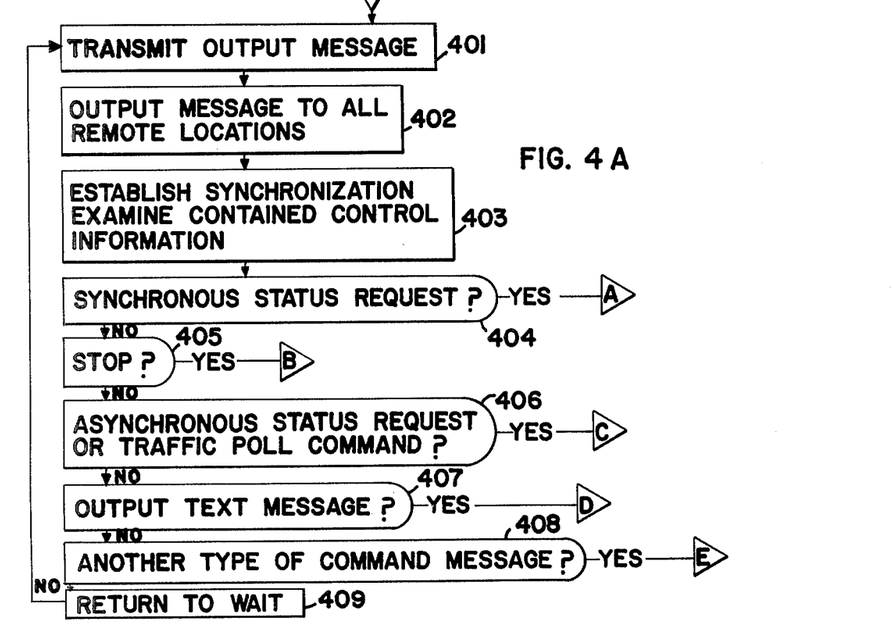
Figure 4B:
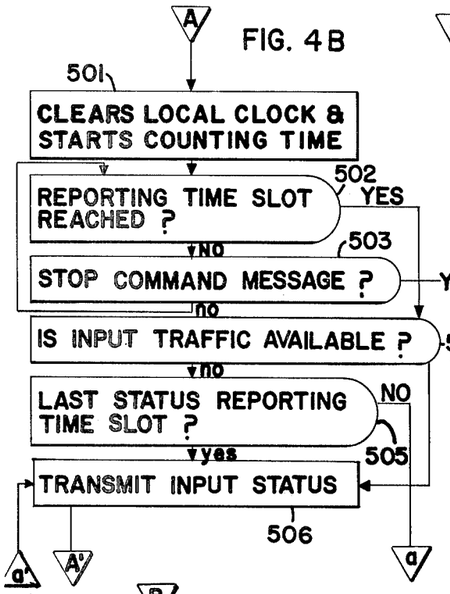
Figure 4C:
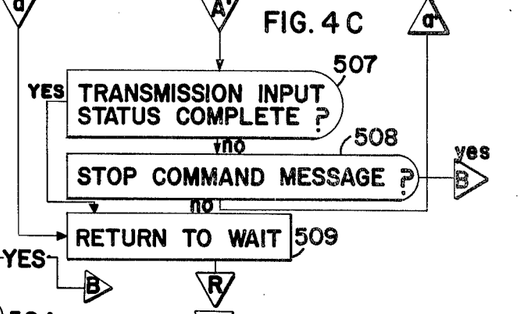
Figure 4D:
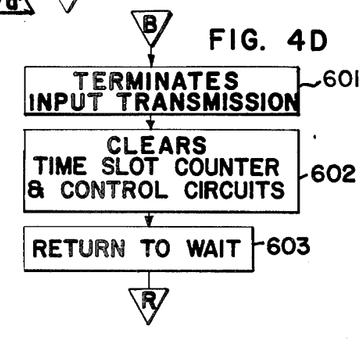
Figure 4E:
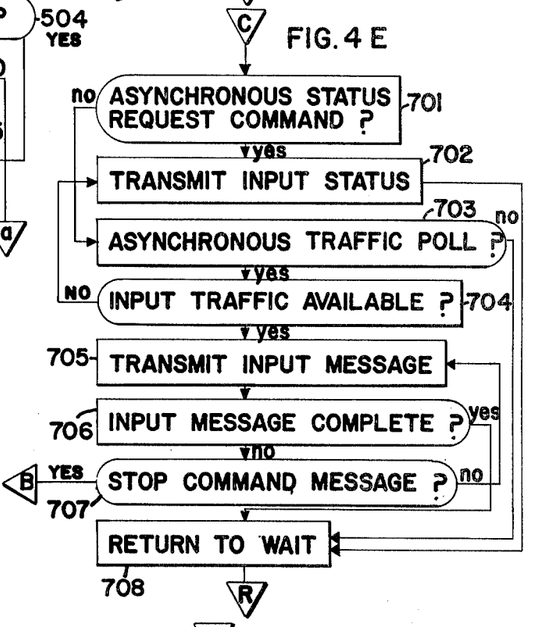
Figure 4F:
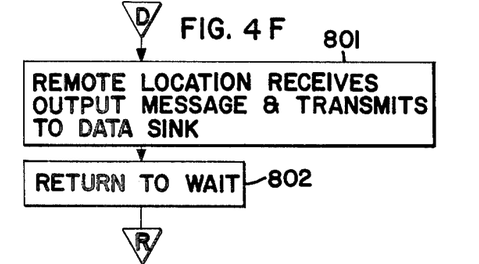
Figure 4G:
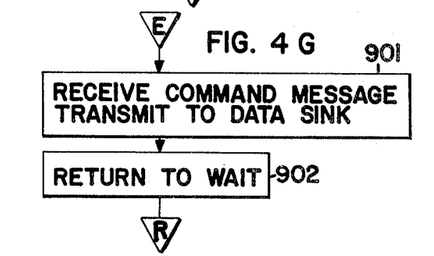

FIG. 3 illustrates an alternative embodiment of the present invention wherein a microprocessor 300 or other programmable device is utilized in hybrid multiplexing control network 200. Microprocessor 300 may be selected from any number of commercially available devices which have a storage or memory function, a processor function, and input/output functions. A clock 131' provides timing signals to microprocessor 300 synchronizing and controlling the functions thereof. In this alternative embodiment of the present invention remote modem/circuit terminators 110' with demodulator 112' and modulator 114' receive and transmit signals to outbound circuit 106' and inbound circuit 108' of common communications facility 104'. Common communications facility 104' is associated with a central processing unit 100. Line receivers 122', 126', 166', and 192' and line drivers 162' and 188' function identically as corresponding elements of the embodiment of the present invention having hardwired hybrid multiplexing control network 200 as shown in FIG. 2. Additionally, terminal data sink 138' and terminal data source 154' transmit and receive information, timing signals and control data on lines 134b' 146', 148', 182', 196', 197', and 199' in similar fashion to the embodiment shown in FIG. 2.

The operation of the present invention as illustrated in the alternative embodiments of FIG. 2 and FIG. 3 will now be described with reference to a functional flow diagram shown in FIGS. 4A-4G. It should be understood that the signal processing and transmission of embodiments shown in FIGS. 2 and 3 are substantially identical with an appropriately programmed microprocessor 300. Therefore this discussion of the operation of the present invention is equally applicable to both embodiments. For the sake of this discussion, it is assumed that central processing unit 100 has transmitted an output message at block 401. The operation and function of a central processing unit 100 will be described in more detail hereafter.

At 402 the transmitted output message is passed to local modem/circuit terminator 102, common communications facility 104, and remote modems/circuit terminators $110_1$-$110_n$. The remote locations establish sychronization with the received message at 403 and examine any control information contained in the message to ascertain the message type. At 404 if the received message is decoded as a synchronous status request then 501 is entered whereby the remote location clears its local clock to 0 and begins to count time increments. The clock is monitored at 502 to ascertain when the particular remote locations time slot occurs. When the remote locations reporting time slot is reached block 504 is entered to determine whether or not there is input traffic available to transmit to the central processing unit from the reporting remote location. If there is input traffic available for transmission to the central unit the process branches to block 506 where the remote location transmits an input status message. From step 506 the process proceeds to step 507. At 507 it is determined whether or not the transmission of the input status message is complete if the answer is yes branch 509 is entered returning the remote location to the wait state. At step 507 if the transmission of the input status message is not complete step 508 is entered where the parameters are monitored to determine if a stop command message is being received. If a stop command message is not being received, the system returns to step 506. If a stop command message is being received process proceeds to step 601.

Returning to step 504 if it is determined there is no input traffic available from the particular remote location then the signal branches to step 505 for a determination as to whether or not the particular remote location has the designated last status reporting time slot. If the answer at step 505 is yes, step 506 is entered as before and the remote location transmits the input status message. If the response at 505 is no the process branches to 509 whereby the remote location returns to the wait state.

If the remote location status reporting time has not been reached at step 502, then 503 is entered and it is determined whether or not a stop command message is being received. If the response is negative at 503 the process returns to step 502. If the response at 503 is positive then 601 is entered. Upon determination that a stop command message is being received, at step 601 the remote location terminates any input transmission that may have been in progress. At step 602 the remote location clears its synchronous status reporting time slot counter and the related control circuits. Next at step 603 the remote location returns to the wait state.

At step 404, if the received message at the remote terminal is not a status request command message the program branches to step 405 where it is ascertained whether or not a stop command message is being received. If the answer is yes at step 405 step 601 is entered. On the other hand, if the answer at step 405 is negative, then the system proceeds to step 406 where the received message is decoded to determine whether or not an asynchronous status reguest or traffic pool command message is being received from the central processing unit. If the response at step 406 is positive step 701 is entered. At step 701 the received message is decoded and it is determined whether or not the message is an asynchronous status request command. If the answer is positive, at step 702 the remote location transmits its input status message and returns at step 708 to the wait state. If the response at step 701 is negative, the system branches to step 703 where it is determined whether or not the received message is an asynchronous traffic poll message. If the answer is negative at step 703 the remote location returns to the wait state at step 708. If the response at 703 is positive step 704 is entered for determination as to whether or not there is input traffic available to transmit from the remote location. If the answer is negative the process returns to 702. On the other hand, if the answer is positive step 705 is entered and the remote location transmits the input message which is received from the terminal data source. At step 706 the transmission is monitored to ascertain whether or not the transmission of the input message is complete. If the answer is positive the remote location returns to the wait state at step 708. If the answer is negative at step 706, step 707 determines whether or not a stop command is being received. If the answer is yes, the process branch is to step 601. If the answer is no then this system returns to step 705 with the transmission of the input message continuing.

Returning to steps 406, if it is determined that the received message is not an asynchronous status request or traffic poll command message, step 407 is entered to determine whether or not the received message is an output text message. If the answer is positive the system branches to step 801. At step 801 the remote location receives the output text message and transmits the text message to the data sink at the remote location. At step 802 the remote location then returns to the wait state. If the response at step 407 is negative, step 408 is entered and it is determined whether or not the received message from the central processing unit is another type command message. If the answer is negative the remote location returns to wait state. If the answer is positive the system branches to step 901 where the remote location receives the command message and transmits the command message to the data sink for further action in response thereto. Then at step 902 the remote location returns to the wait state.

Figure 5A:
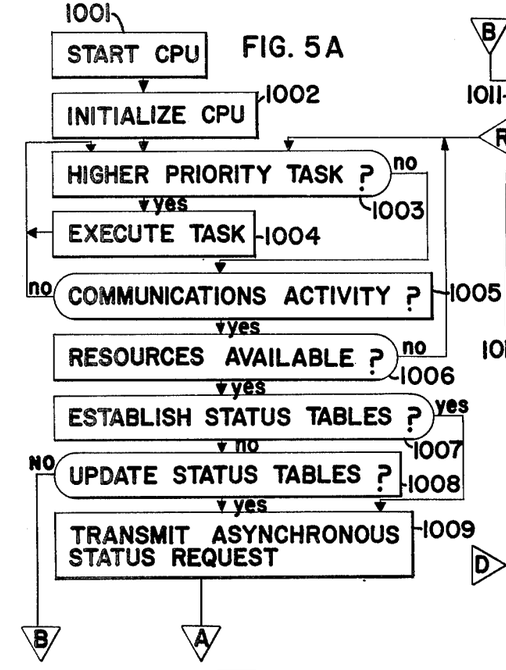
Figure 5B:
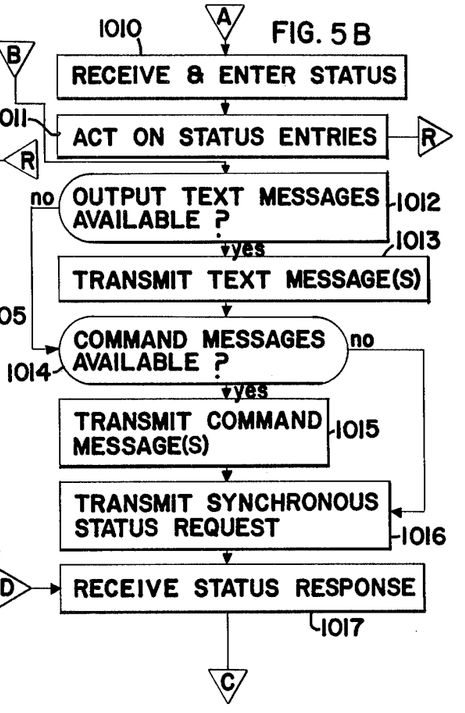
Figure 5C:
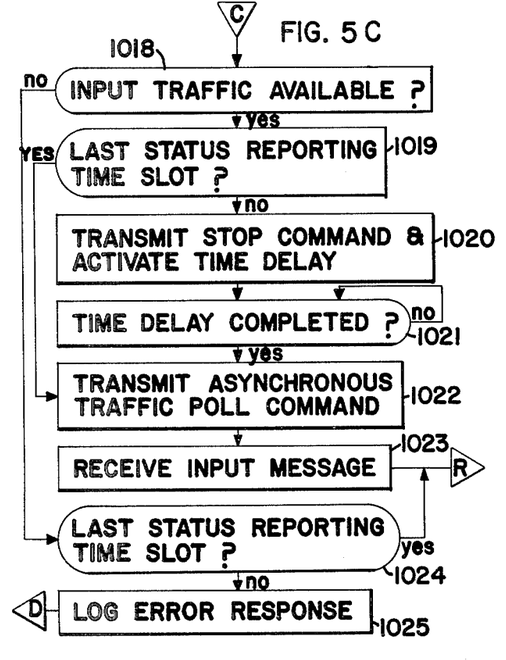

FIGS. 5 A-5C is a block diagram representation of the activities and steps occurring at central processing unit 100. Central porcessing unit 100 is started and initalized at steps 1001 and 1002. At step 1003 it is ascertained whether or not a higher priority task awaits processing. At step 1004 the higher priority task, if any, is executed and the system returns to step 1003. If there is no higher priority task awaiting processing, step 1005 is entered where it is determined whether or not there is a communications activity to be performed. If the response at step 1005 is negative the system returns to step 1003. If there is a communications activity to be perormed inquiry is made at step 1006 to ascertain the sufficiency of system resources available to accommodate the communications activity. If sufficient resources are not available the system returns to step 1003. If it is determined that there are sufficient system resources for the communications activity then a check is made at step 1007 to determine whether or not remote location status tables must be established as a result of system initialization. If status tables must be established, central processing unit 100 transmits individual asynchronous status request messages to each remote location at step 1009. At step 1010 the input status messages from the remote locations are received and entered in the terminal location status tables. The operation proceeds to step 1011 where central processing unit 100 takes the appropriate action on the remote location status entries requiring attention. The system then returns to step 1003. Referring back to step 1007, if it is unnecessary to establish location status tables a check is made at 1008 as to whether or not the location status tables must be updated due to elapsed time since the last entries therein. If the response at step 1008 is positive step 1009 is entered. If the answer at step 1008 is negative the system proceeds to step 1012.

At step 1012 it is determined whether or not there are output text messages from central processing unit 100 that are available for transmission. If such messages are available for transmission step 1013 is entered and the output text messages are transmitted. Following transmission of output text messages, at step 1014 a check is made as to whether or not any other types of command messages are available for transmission. If the answer at step 1012 is negative then step 1014 is also entered. If other types of command messages are available for transmission, the transmission of such other type messages is made at step 1015. Following step 1015 a synchronous status request message is transmitted at step 1016. At step 1014 if no other types of command messages were available for transmission the process would proceed to step 1016 for the transmission of the synchronous status request command message. At step 1017 status response messages are received. Upon receipt of the status response messages it is determined at step 1018 whether or not the status response message indicates that there is input traffic available for transmission from the remote location to the central processing unit. If there is no such input traffic available for transmission the process proceeds to step 1024 where an inquiry is made as to whether or not the responding remote location has the designated status reporting time slot. If the response at step 1024 is positive, step 1003 is again entered. If the response at 1024 is negative an error response is logged in a remote location status table at step 1025 for subsequent action as appropriate. The process returns to step 1017 for receipt of another status response message since the error status message was not transmitted by the remote location having the designated last status reporting time slot.

If the status response message indicates that there is input traffic available to transmit from the remote location, the process proceeds from step 1018 to step 1019 where it is again ascertained as to whether or not the responding remote location has the last status reporting time slot. If the responding remote location does have the designated last status reporting time slot step 1022 is entered and the central processing unit transmits an asychronous traffic poll command message to the remote location. The remote location responds by transmitting the input message which is received by the central processing unit at step 1023. The system then returns to step 1003. If there is a negative response at step 1019 the processing proceeds to step 1020 whereby a stop command message is transmitted and a time delay is activated by the central processing unit to enable the stop command to be received and acted upon by the remote terminals. At step 1021 inquiry is made as to whether or not time delay is completed. Upon completion of the time delay, processing proceeds at step 1022 by the transmission of the asynchronous traffic poll command message to the remote location reporting available input traffic. The input message is again received at step 1023 and the processing returns to step 1003.

From the above description, it can be understood that the present invention is a hybrid multiplexing control system for data transmission between a central unit and a plurality of remote terminals along a common communications facility wherein synchronous control of the remote terminal status reporting activities and asynchronous control of text data transmissions are combined. The hybrid multiplexing system described herein significantly reduces the demands placed on the centrl processing unit to control the multiplexing process. More efficient utilization of the central processing unit is achieved by utilizing the hybrid multiplexing system described herein, in particular with reference to the synchronous status reporting. For example, utilizing the SABRE (IBM 1006) communication protocol with a maximum of 8 remote terminal locations, status reporting using hybrid multiplexing techniques having synchronous status reporting resulted in a time savings of approximately 125 milliseconds over conventional asynchronous status reporting techniques. This comparison assumes a 4800 bits-per second capacity. It can be appreciated that such time savings at the central processing units potentially frees the central processing unit for other processing or communications tasks that arise. The useful capacity of the central processing unit and the common communications facility shared by multiple users is significantly increased. The hybrid multiplexing system techniques described herein result in improved cost effectiveness when applied in computer, communications, and computer/communications systems.

What is claimed is:

1. In combination with a communication system wherein a plurality of remote terminals time share at least one central station and are connected thereto over a common communications channel for the transmission of information therebetween, multiplexing means comprising:
    (a) means at said central unit for initiating and transmitting a single status request command signal over said communications channel to said plurality of remote terminals;
    (b) means at each of said terminals for generating a status response message and transmitting said status message over said communications channel to said central station;
    (c) control means at each of said remote terminals for providing sequenced transmission of said status response messages to said central station, said control means including timing means responsive to said single status request signal to initiate transmision of said status message at a preselected time following receipt of said status request command signal;

(d) means at said central station for initiating a stop command message for transmission over said common communications channel to said plurality of remote terminals in response to receipt at said central unit of a particular status message transmitted by at least one of said remote terminals; and (e) means at each of said remote terminals for receiving said stop command messages and terminating the sequence transmission of said status response messages in response thereto.

2. The combination in accordance with claim 1 wherein said means for generating a status response message includes means for decoding messages transmitted by said central unit and determining whether or not the decoded message is a status request command.

3. In combination with with a communication system wherein a plurality of remote terminals time share at least one central station and are connected thereto over a common communications channel for the transmission of information therebetween, multiplexing means comprising:

(a) means at said central unit for initiating and transmitting a single status request command signal over said communications channel to said plurality of remote terminals;

(b) means at each of said terminals for generating a status response message and transmitting said status message over said communications channel to said station;

(c) control means at each of said remote terminals for providing sequenced transmission of said status response messages to said central station, said control means including timing means responsive to said single status request signal to initiate transmission of said status message at a preselected time following receipt of said status request command signal; and (d) means associated with the designated last remote terminal in a predetermined sequence for generating and transmitting a signal to said central unit indicating termination of synchronous status request reporting by said plurality of remote terminals.

4. A communications system comprising:
(a) a plurality of remote terminals;
(b) at least one central unit time shared by said plurality of remote terminals;
(c) a common communications channel connecting each of said remote terminals to said central unit;
(d) multiplexing means for the transmission of status messages and text messages between said remote terminals and said central unit, said multiplexing means comprising:
  (i) means at said central unit for synchronously polling each remote terminal to ascertain status information thereof;
  (ii) means at said central unit for asynchronously polling each remote terminal to initiate the transmission of text messages from said remote terminal to said central unit;
  (iii) means at said remote terminal for transmitting said status and text information to said central unit in response to signals from said synchronous and asynchronous polling means;

(e) means at said central unit for receiving status information and initiating a stop command message in response to receipt of status information from one of said terminals indicating a text message available for transmission to said central unit;

(f) means at each of said remote terminals for receiving said stop command message and terminating the sequenced transmission of status information to said central unit.

5. A communications system in accordance with claim 4 wherein said means for synchronously polling each remote terminal comprises means at said central unit for initiating and transmitting a single status request command signal over said common communications channel to said plurality of remote terminals.

6. A communications system in accordance with claim 5 wherein said means for transmitting status information and text messages to said central unit comprises:

(a) control means at said remote terminals providing sequenced transmission of status information to said central unit, said control means including timing means responsive to said single status request command signal to initiate transmission of said status information at a pre-selected time following receipt of said status request command.

7. A communications system is accordance with claim 4 comprising time delay means at said central unit operable upon initiation of said stop command message to delay further transmission of command messages from said central unit for a pre-determined time delay effective to allow each remote terminal to receive and act upon said stop command message.

8. In a communication system wherein a plurality of remote terminals time share at least one central unit and are connected thereto over a common communications channel for the transmission of information therebetween, a hybrid multiplexing method comprising the steps of:

(a) transmitting from said central unit to said plurality of remote terminals a single status request command signal;
(b) receiving said command signal at each of said remote terminals;
(c) sequentially transmitting status information from said plurality of remote terminals in response to said status request command signals;
(d) receiving status information at said central unit from said remote terminals having text information available for transmission to said central unit;
(e) asynchronously polling said remote terminals to initiate the transmission of text information to said central unit from said remote terminals having text information available for transmission;
(f) transmitting a stop command message from said central unit to said plurality of remote terminals in response to receipt of status information from at least one of said remote terminals indicating text information available for transmission from said at least one of said remote terminals to said central unit;
(g) receiving and decoding said stop command message at said remote terminals; and
(h) terminating the sequeced transmission of status information from said plurality of remote terminals to said central unit in response to said decoded stop command message.

9. A hybrid multiplexing method in accordance with claim 8 wherein the step of sequential transmission of status information comprises the step transmitting status information from each of said plurality of remote terminals at a pre-selected time following receipt of said status request command.

10. In a communication system wherein a plurality of remote terminals time share at least one central unit and are connected thereto over a common communications channel for the transmission of information therebetween, a hybrid multiplexing method comprising the steps of:
 (a) transmitting from said central unit to said plurality of remote terminals a single status request command signal;
 (b) receiving said status request command signal at each of said remote terminals;
 (c) sequentially transmitting status information from said plurality of remote terminals in response to said status request command signal;
 (d) receiving status information at said central unit from said remote terminals having text information available for transmission to said central unit;
 (e) asynchronously polling said remote terminals to initiate the transmission of text information to said central unit from said remote terminals having text information available for transmission;
 (f) initiating a status information signal from the last station in a polling sequence at the designated last remote terminal in a sequence;
 (g) transmitting said status information signal from said designated last remote terminal to said central unit; and
 (h) terminating status information reporting from said remote terminals in response to receipt of said status information signal from said designated last remote terminal.

11. In combination with a communication system wherein a plurality of remote terminals time share at least one central station and are connected thereto over a common communications channel for the transmission of information therebetween, multiplexing means for the transmission of data between the remote terminals and the central station, the data including command messages, status messages, and text messages, said multiplexing means comprising:
 (a) means for establishing synchronous transmission of data between the central unit and the remote terminals;
 (b) means for establishing asynchronous transmission of data between the central unit and the remote terminals;
 (c) means at the central unit for generating command signals to initiate and control transitions from asynchronous to synchronous data transmission modes; and
 (d) means at said remote terminals for responding to said command signals from the central unit to initiate and control transitions at the remote terminal between asynchronous and synchronous data transmission modes.

12. In combination with a communication system wherein at least one remote terminal communicates with at least one central station and is connected thereto over a communications channel for the transmission of information therebetween, means for controlling the transmission of information comprising:
 (a) means at said central station for initiating and transmitting a status request command signal over said communications channel to said at least one remote terminal;
 (b) means at said at least one remote terminal for generating a status response message and transmitting said status message over said communications channel to said central; and
 (c) control means at said least one remote terminal for regulating the transmission of said status response message to said central station, said control means including means for inhibiting the transmission of redundant status information to said central station when said status information of said at least one remote terminal has not changed since the last reporting thereof.

* * * * *